United States Patent [19]

Chen

[11] Patent Number: 5,317,631

[45] Date of Patent: May 31, 1994

US005317631A

[54] LOCAL SWITCHING SYSTEM

[75] Inventor: Abraham Y. Chen, Mountain View, Calif.

[73] Assignee: Areanex Technology, Inc., Cupertino, Calif.

[21] Appl. No.: 843,468

[22] Filed: Feb. 27, 1992

[51] Int. Cl.⁵ .................. H04M 1/00; H04M 1/64; H04M 3/42; H04M 7/00

[52] U.S. Cl. ................................. 379/164; 379/67; 379/165; 379/212; 379/233; 379/234

[58] Field of Search ............... 379/156, 157, 158, 164, 379/165, 67, 68, 212, 213, 214, 233, 234

[56] References Cited

U.S. PATENT DOCUMENTS 4,896,345  1/1990  Thorne .................. 379/214 X
5,022,069  6/1991  Chen .................... 379/157 X Primary Examiner—James L. Dwyer
Assistant Examiner—Harry S. Hong
Attorney, Agent, or Firm—Baker & McKenzie

[57] ABSTRACT

An Improved Local Switching System provides a full set of business telephone functions for at least two main switch telephone lines and a number of local stations. A Master Switching Unit (MSU) serves outgoing, incoming and local call requests and maintains stable talking connections. A call router (ACR) monitors one of the main switch lines for incoming calls, refers call requests to the MSU, accepts responsibility for transferring MSU stable talking connections to the call router; and handles outgoing calls when the MSU is not available to serve-an call origination request. A transfer switch, under control of the call router, transfers the main switch lines between the MSU and the call router.

8 Claims, 7 Drawing Sheets

LOCAL SWITCHING SYSTEM

TECHNICAL FIELD

This invention relates to small on-premises switching systems.

BACKGROUND OF THE INVENTION

Small on-premises switching systems provide service to one or more central office lines and a modest number of standard telephone station sets and other subscriber facilities e.g., answering sets, FAX machines, personal computers, etc. The control facilities for such systems range from a full set of control apparatus, which are permanently assigned to the central office lines on a one-for-one basis, to common control apparatus which is shared among all central office lines and all subscriber facilities. In common control systems, facilities to detect: ringing and on-hook/off-hook supervision are associated with the central office lines and with the station sets to recognize requests for service e.g., call origination, call termination, call transfer, etc. In such systems, the common control apparatus serves such requests.

While common control systems permit the addition of central office lines and station apparatus to systems, the initial cost of the common control apparatus generally precludes their use with only a few central office lines. On the other hand, in systems which employ control apparatus dedicated to a single central office line, the control apparatus is generally under utilized.

Although present on-premises switching systems provide a wide range of subscriber services, there is no provision for sharing the incoming and outgoing calling loads among bi-directional central office lines.

DISCLOSURE OF THE INVENTION

In accordance with my invention, a local switching system comprises: a full featured single line master switching unit (MSU); at least one call router, and at least one line transfer switch to extend the call switching functions and business features of the master switching unit to two or more standard telephone lines to a main office and to one or more subscriber stations served by those lines.

Master Switching Unit (MSU) serves outgoing, incoming and local call requests and maintains stable talking connections; and call router (ACR) monitors one of the main switch lines for incoming calls, refers call requests to the MSU, accepts responsibility for transferring MSU stable talking connections to the call router; and handles outgoing calls when the MSU is not available to serve an call origination request. The transfer switch, under control of the call router, transfers the main switch lines between the MSU and the call router.

Advantageously, the switching system of my invention may be used as a PABX connected to lines of a central office of the public switched telephone network (PSTN). Alternatively, my invention may be employed to expand the functions of an existing on-premises switching systems e.g., a PBX or a key telephone switching system. In those cases, the PBX or the key switching unit replaces the functions of the central office.

THE DRAWING

Figure 1:
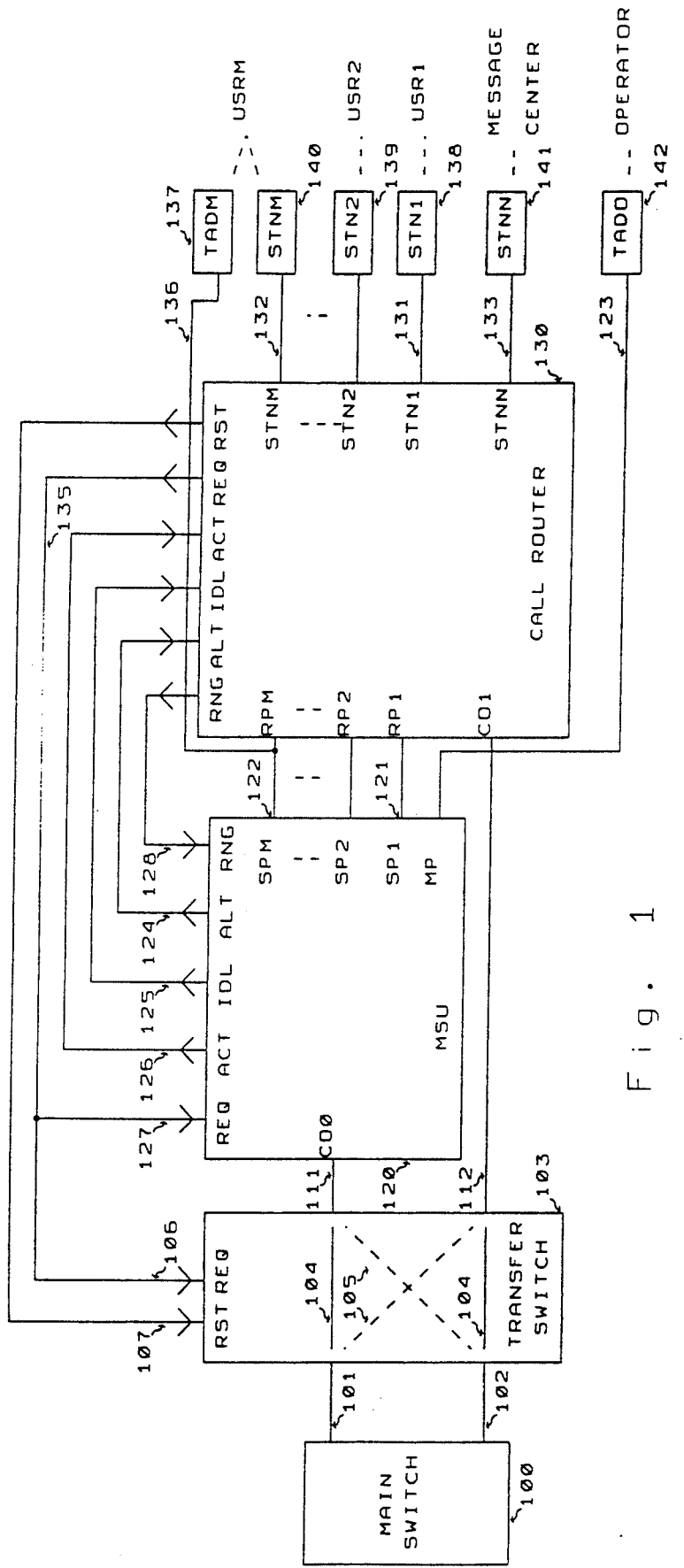
FIG. 1 is a block diagram of an on-premises switching system in accordance with my invention.
Figure 4:
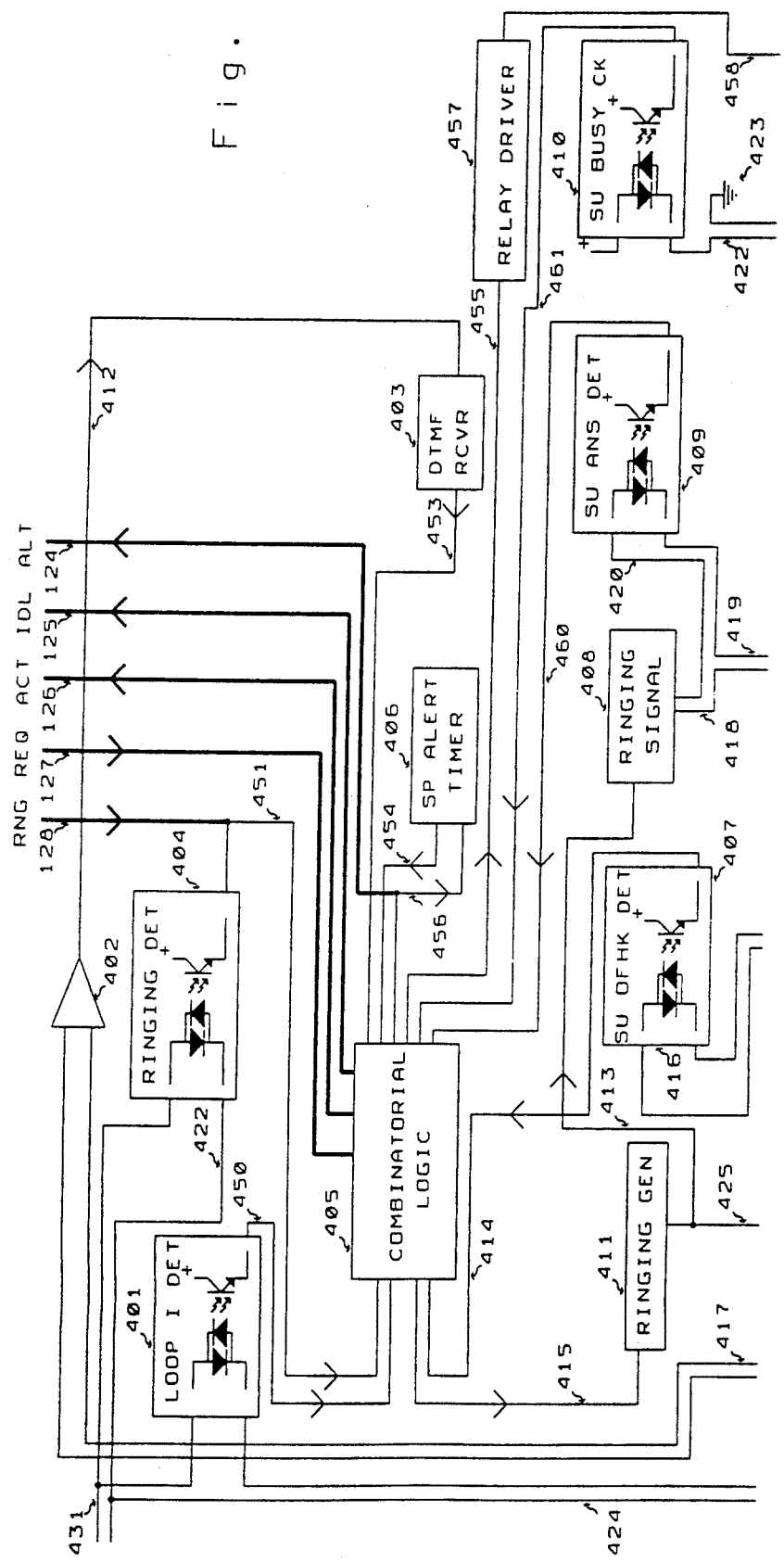
Figure 5:
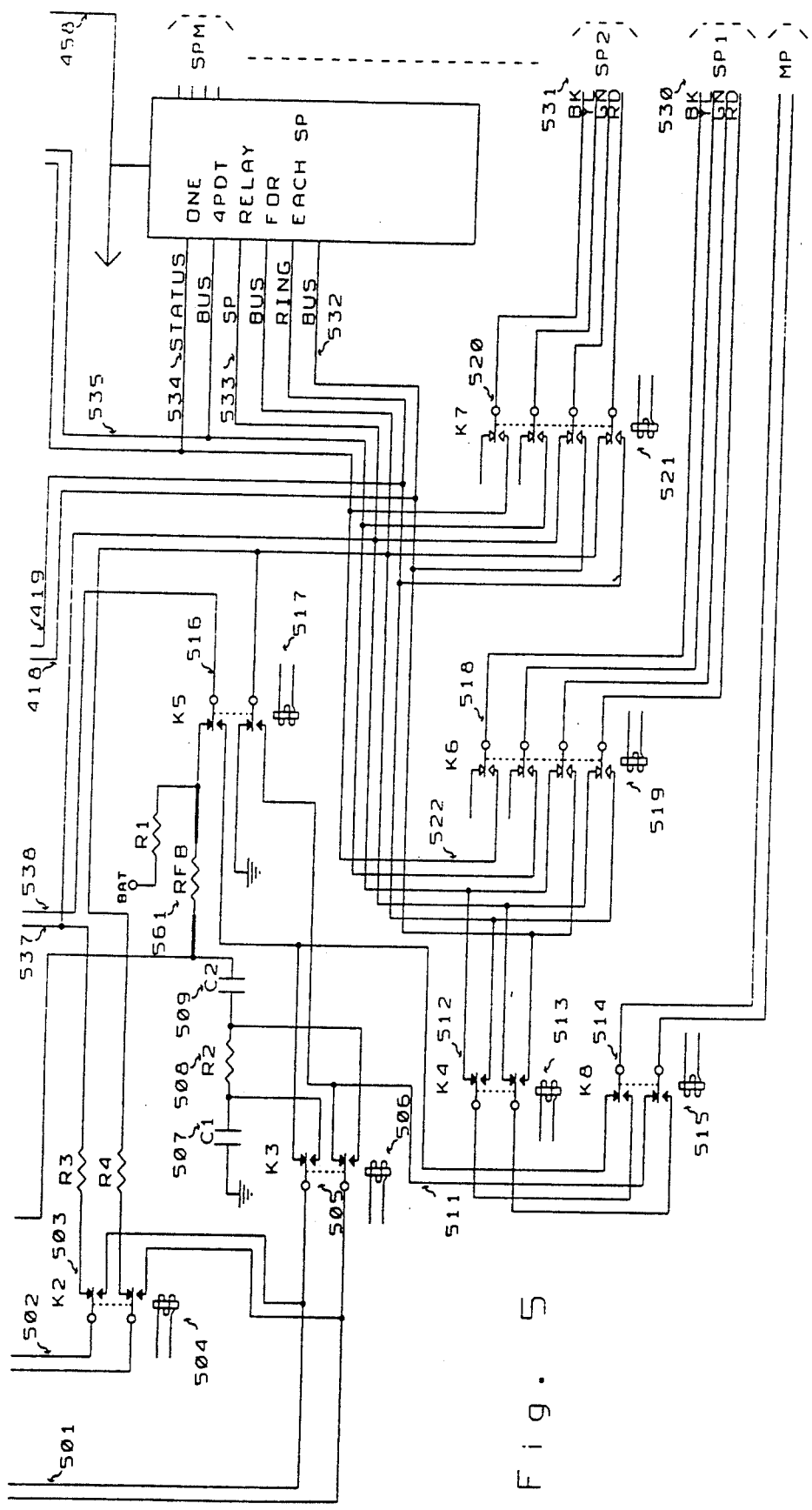
Figure 6:
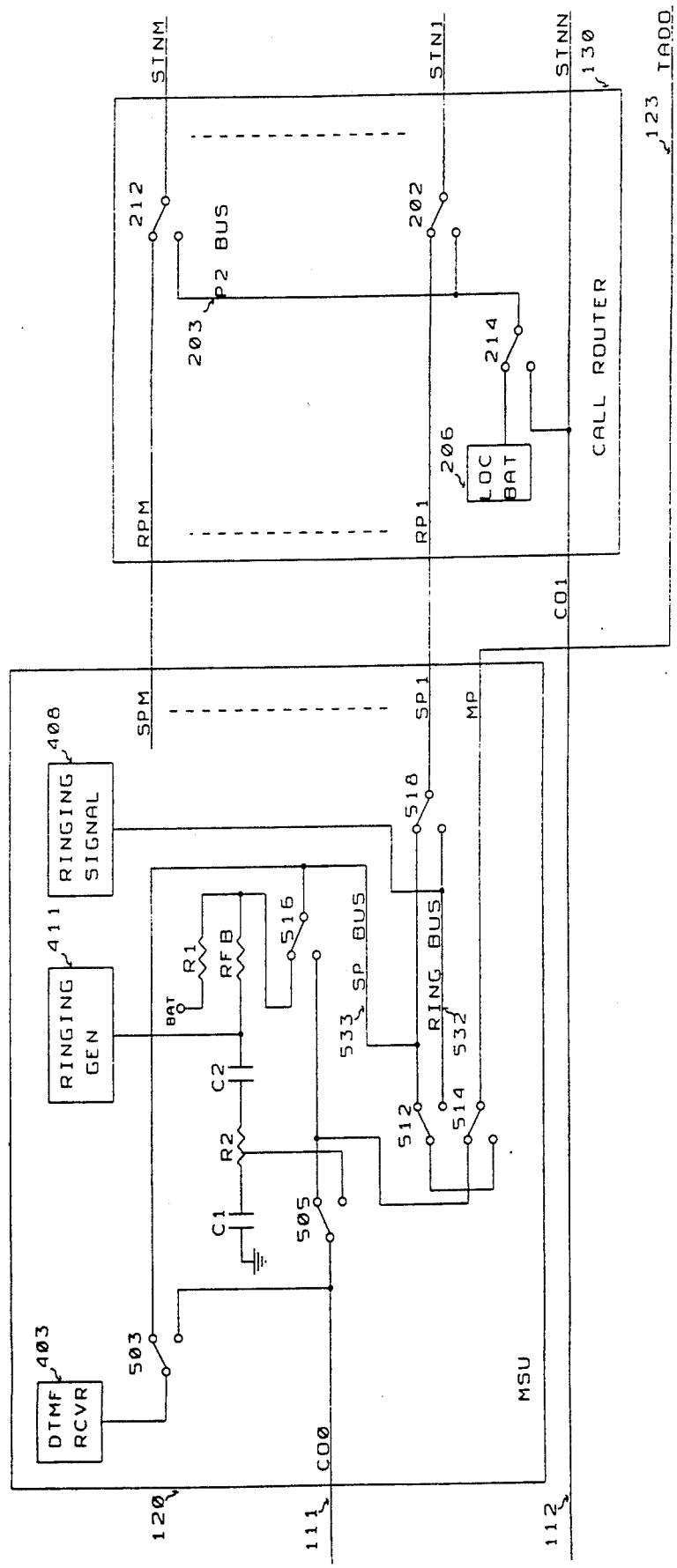
Figure 7:
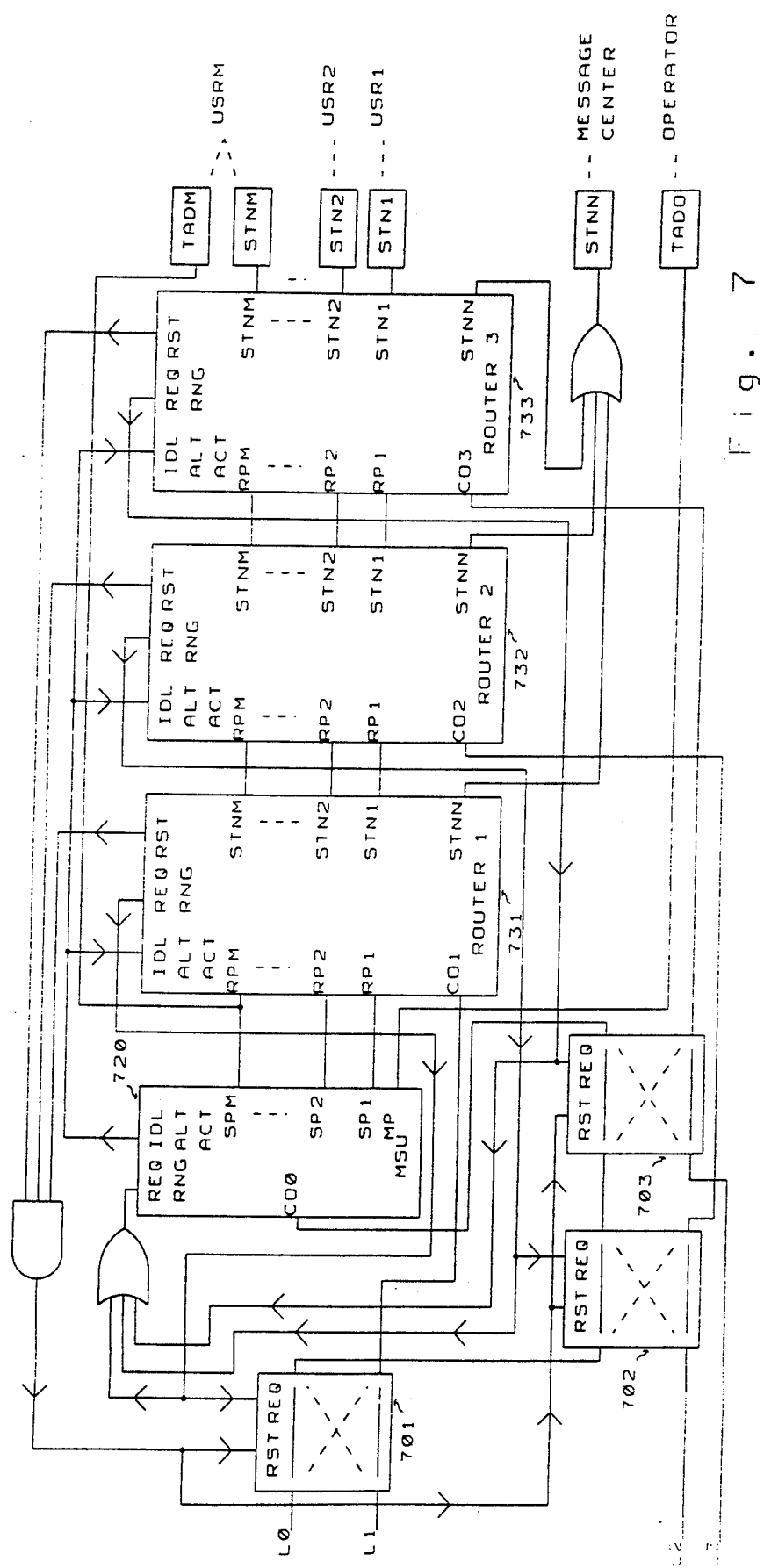

FIGS. 4 and 5 together are a schematic diagram of the MSU of FIG. 1;

FIG. 6 is a functional block diagram of switching paths in MSU 120 and in call router 130; and FIG. 7 illustrates the use of a plurality of transfer switches and a corresponding plurality of call routers in accordance with my invention.

DETAILED DESCRIPTION

FIG. 1 is a schematic block diagram of an illustrative two line on-premises switching system in accordance with my invention with provision for connections to a main switch 100. Arrangements for serving more than two lines with my switching system are shown in FIG. 7. The main switch 100 may be an end central office of the Public Switched Telephone Network (PSTN) or it may be a local PBX or a local key system. In any event, lines 101 and 102 are two standard telephone loop circuits served by main switch 100.

As seen in FIG. 1, my full featured single line master switching unit 120 has access to main office lines 101 and 102 on a mutually exclusive basis via transfer switch 103; and has access to station ports STN1-STNM via call router 130, which is interposed between MSU 120 and station lines 131, 132.

The major switching paths through MSU 120 and call router 130 are illustrated schematically in FIG. 6. As seen in FIG. 6, call router 130 has a plurality of line switching relays 202-212, equal in number to the number of station ports STN1-STNM, for selectively switching the station ports between their respective router ports RP1-RPM and P2 bus 203.

Accordingly, relays 202-212 each, with respect to station ports STN1-STNM, correspond in function to the role of transfer switch 103 with respect to main switch lines 101, 102.

In call router 130, relay 214 serves to switch P2 bus 203 between local battery 206 and port CO1. When call router 130 is idle, the relays 202-212 that are associated with station lines that are idle, are operated to connect their station ports to P2 bus 203; and relay 214 is released to connect the P2 bus to local battery and ground. Although not shown in FIG. 6, there are station current detectors e.g., 222 of FIG. 2 which are individually associated with station ports STN1-STNM. An output from one of the detectors 202, 222 of FIG. 2 indicates an originating request for service from the associated station. If MSU 120 is "idle", call router 130 releases the appropriate one of the relays 202-210 to connect the calling station to MSU 120 via the associated one of the router ports RP1-RPM. If MSU 120 is not "idle", router 130 releases all of the relays 202-212 except the one serving the call origination; and operates relay 214 to connect P2 bus 203 and the station port of the calling station to port CO1 which is connected to main switch 100 via transfer switch 103. The request for call originating service is thus passed to main switch 100 for service.

In addition to detecting requests for originating serve, call router 130 is arranged to detect, but not to handle, incoming calls which appear at line port CO1. Call router 130 refers all incoming call requests to MSU 120 for service. If MSU 120 is "idle" or maintaining a stable talking connection at the time an incoming call is detected by router 130, the call is transferred to MSU 120 for service. If MSU 120 is maintaining a talking connection, that connection is transferred to router 130 and the incoming call is transferred to MSU 120. Operation of line transfer switch 103 by router 130 and selective operation of station relays 202, 212 effects the transfer of calls between MSU 120 and router 130.

Transfer switch 103 provides two alternate pairs of connections between lines 101 and 102 and paths 111 and 112, the "preferred" pair of connections 104 and the "alternate" pair of connections 105. Upon occurrence of a RESET signal (RST) on conductor 107, the "preferred" solid line connections 104 are established. Call router 130 generates a RESET signal at initial "power-up" of my system and whenever both MSU 120 and call router 130 are both idle. As explained later herein, Call Router 130, upon detection of an incoming call from main switch 100 at port CO1, or upon detection of an originating request for service from one of the stations 138-140, generates a REQUEST signal (REQ) on conductor 135 if MSU 120 is "available" to serve the call. A REQ signal on conductor 106 causes transfer switch 103 to alternate between the "preferred" paths 104 and the alternate paths 105; and a REQ signal on conductor 127 resets MSU 120 to the power-up idle state in preparation for handling call requests detected by call router 130. When transfer switch 103 is in the reset state, line 101 serves outgoing calls handled by MSU 120.

With a view towards balancing the usage between lines 101 and 102, main switch 100 first attempts to complete a call via line 102; and only selects line 101 if line 102 is engaged in a call.

This complementary call setup arrangement i.e. favoring the use of line 101 for outgoing calls and favoring the use of line 102 for incoming calls, tends to minimize the possibility of a "glare" condition on loop-start telephone lines 101, 102. Although the benefits of these arrangements are not available whenever switch 103 has been toggled to the alternate state, the benefits are enjoyed a large portion of the time by resetting switch 103 whenever both MSU 120 and call router 130 are idle.

Figure 3:
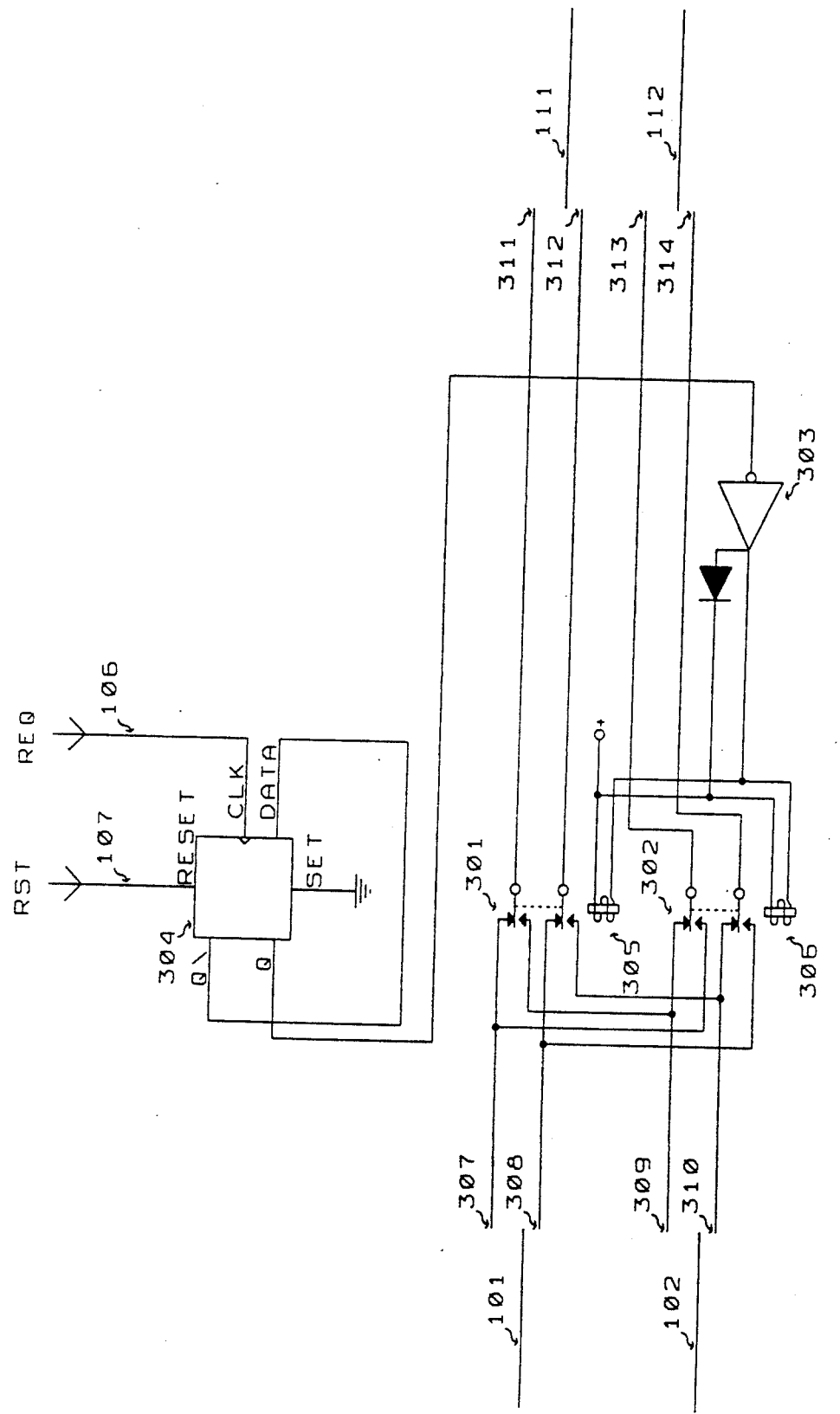
FIG. 3 is a schematic diagram of a transfer switch of FIG. 1.

Transfer switch 103 is shown in greater detail in the schematic drawing of FIG. 3. Switching between main switch lines 101, 102 and MSU path 111 and call router path 112 is provided by relays 301 and 302. When relays 301 and 302 are both in the released state, line 111 is connected to path 111 via the back contacts of relay 301 and line 102 is connected to path 112 via the back contacts of relay 302. Flip-flop 304 is reset by a reset signal RST on conductor 107 and is toggled by request signals REQ on conductor 106. An active signal on the Q terminal of flip-flop 304 serves to energize windings 305 and 306 of relays 301 and 302. Each REQ signal serves to toggle the state of flip-flop 304 and thus serves to toggle the states of relays 301 and 302.

Master switching unit 120, except for: (a) introduction of control communication conductors 124-128 with call router 130; (b) addition of the connection of RFB resistor 561 to provide both "audible ringing tone" and "local call waiting" tone during local station to station calls; and (d) the signal processing associated with these additions, is identical to a master switching unit e.g., MSU 102 of my U.S. Pat. No. 5,022,069. Master switching unit 120 is shown in greater detail in FIGS. 4 and 5 which correspond generally to FIGS. 2 and 3 of my U.S. Pat. No. 5,022,069. The additions to FIG. 4 to accommodate communication with the call router 130 comprise conductors 124-128 (drawn in heavy lines to depict additions to the MSU 120) and circuitry within combinatorial logic 405 which is described but not shown herein. For the purpose of providing a complete disclosure of my invention, the detailed description of the operation and features of the MSU to be found in U.S. Pat. No. 5,022,069 are incorporated herein by reference.

In the illustrative embodiment of my invention, MSU 120 serves call origination requests for service which appear at station ports SP1-SPM; and serves incoming requests for service which appear at port CO0. A call origination request may be a request for originating a call through main switch 100 via path 111, 104 and CO0 line 101 or 102; or for an intercom call to one of the stations 138-140.

In the preferred embodiment of my invention, calls which are completed by MSU 120 are maintained by MSU for at least a "guard" period e.g., 30 seconds, to permit the MSU time enough to serve a request for added service e.g., station transfer. After expiration of the "guard" period, MSU 120 is available to serve other requests for service.

MSU 120 provides bi-direction switching service among its main switch port CO0 and station ports SP1 through SPM and its main port MP. Main port MP provides access to a "Telephone Answering Device" TAD0 142 which can be either a manual operator module or an automated attendant service module. In the provision of such services, MSU 120 serves all call origination requests for service which appear at station ports SP1-SPM; and serves incoming requests for service which appear at port CO0.

Control logic within MSU 120 generates and transmits the following status signals to call router 130:

ALERT signal (ALT): A true condition on conductor 124 indicates that MSU 120 is attempting to complete a call to a selected one of the stations STN1-STNM through one of the ports SP1-SPM;

IDLE signal (IDL) A true condition on conductor 125 indicates that MSU 120 is idle and is available to serve call requests.

ACTIVE signal (ACT) A true condition on conductor 126 indicates that MSU 120 is serving a call request which has not matured to a stable talking connection.

When the ACTIVE signal (ACT) and the IDLE signal (IDL) are simultaneously not-true, MSU 120 is maintaining a stable talking path.

The switching structures of MSU 120 and of call router 130 are shown in high level detail in FIG. 6 as an aid to understanding the routing of calls between and through the MSU 120 and call router 130.

Call router 130 comprises: main switch port CO1; a plurality of two-wire station ports STN1 through STNM for connection to stations 138-140; a corresponding plurality of two-wire router ports RP1 through RPM which are associated with the station ports SP1-SPM on a one-for-one basis; and a message center port I41 which is permanently connected to main switch port CO1. Message center station apparatus 141, which is connected to Port STNN via path 133, serves incoming calls on main switch port CO1 that do not receive immediate service from MSU 120. The message center apparatus may be: a telephone answering device which provides an outgoing message to prompt the caller to leave a message; or a music on hold device which advises the caller that "the call will be handled in the order received" followed by a recording of music or an advertisement message. If, during the time that the caller is on hold, the MSU completes service of its current call and indicates that it is available to handle the next call, call router 130 transfers the incoming call to MSU 120 for service and assumes responsibility for the MSU's prior completed talking connection. Alternatively, a standard telephone station set may be connected to the message center port for manual operator operation.

Figure 2:
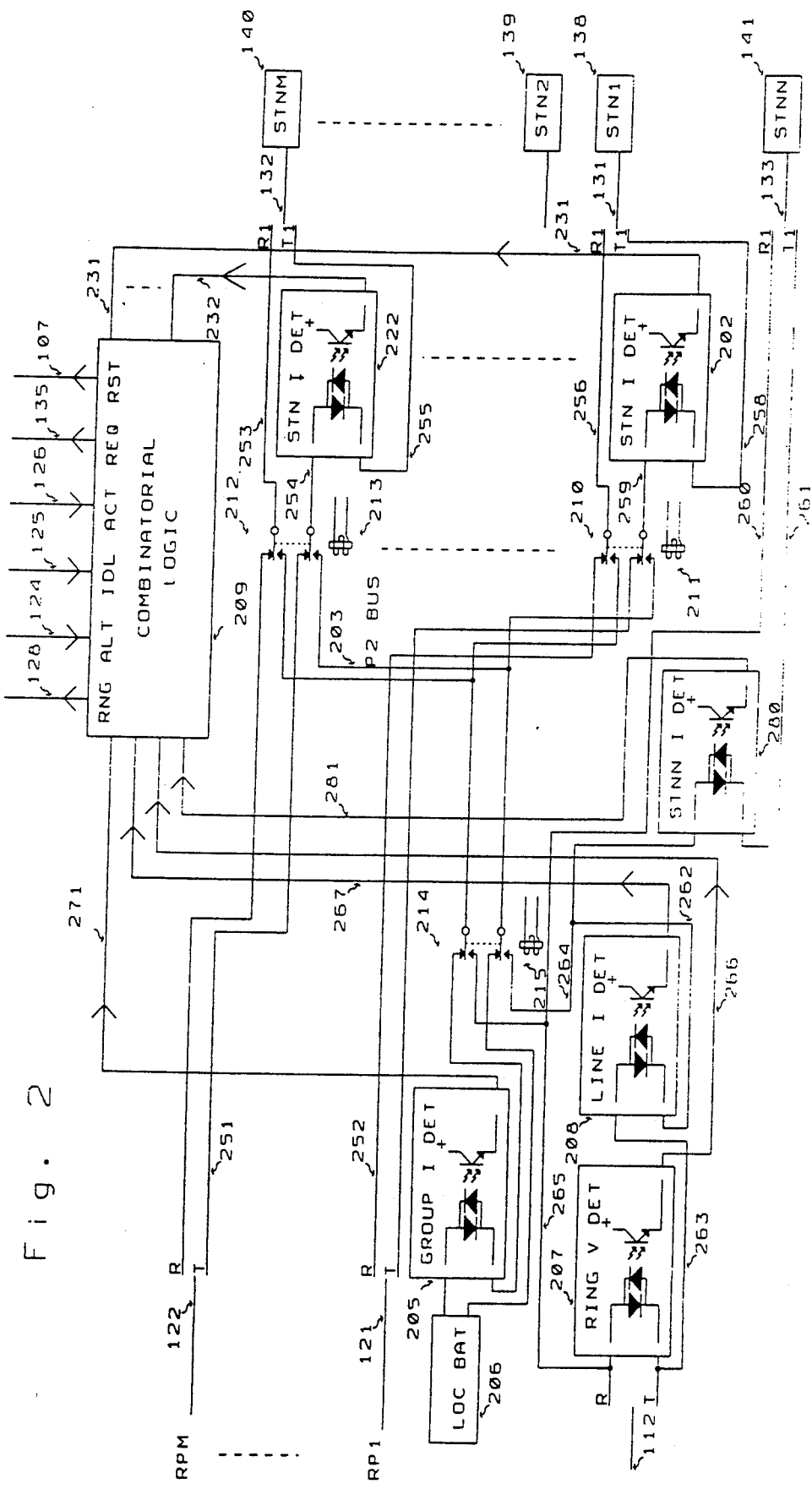
FIG. 2 is a schematic diagram of a call router unit of FIG. 1.

FIG. 2 is a schematic drawing of a call router 130. For purposes of illustration only, the logic arrangements of the block 209 comprise sequential logic circuits, memory, and sources of timing signals to generate output signals for control of circuit elements of the call router of FIG. 2 and for generation of REQ and RST signals. The functions of these sequential logic circuits may be implemented by stored program controlled arrangements without departing from the spirit and scope of the invention.

When my switching system is first turned on, call router 130 is initialized and placed in the "idle" state. In the idle state, relays 210-212 are energized to connect station ports STN1-STNM in parallel to P2 bus 203; and relay 214 is in the released state to connect local battery 206 to the P2 bus. In this configuration of relays 210, 212, and 214, call router 130 is in a position to detect a request for originating service by a station connected to one of the station ports STN1-STNM; and to detect an incoming calls at port CO1.

A request for originating service is indicated when one of the stations 138-140 goes from the on-hook to the off-hook state; and an incoming call at port COI is characterized by the presence of ringing current on line 112 before line supervisory Loop I detector 208 is activated. The occurrence of ringing current on the line 112 is detected by ringing detector 207. The output of detector 207 is connected to the combinatorial logic 209 by conductor path 266; and the output of the Loop I detector 208 is connected to combinatorial logic circuit 209 over path 267.

In the idle state of call router 130, the local stations, which are connected to ports STN1-STNM, are connected in parallel to local battery 206 and ground. Group loop current detector 205, which is in series between local battery 206 and the R1 terminals of station ports STN1-STNM, generates a signal on conductor 271 whenever a connected one of the stations 138-140 is in the off hook state. The individual station loop detector circuits 202, 222, which are in series between P2 bus 203 and the T1 conductor of their respective port, generate signals on their respective output conductors 231, 232 to identify which station port is connected to an off hook one of stations 138-140.

Upon detection of a request for service from one of the stations, e.g., station 138, call router 130 checks the status of MSU; and, if MSU 120 is "idle", combinatorial logic circuit 209 releases relay 210 to connect port STN1 and station 138 to MSU port SP1 via router port RP1.

When station 138 is connected to MSU port SP1, MSU 120 provides local battery to the station via the back contacts of relay K5 of FIG. 5; bridges DTMF receiver 403 of FIG. 4 across line 131 of FIG. 1 via the back contacts of K2 relay 503; and places SU OFHK detector 407 in series with the local battery connection. A station connected to port SP1 can originate a call to a station served by main switch 100 via MSU 120, line 111 and transfer switch 103. Additionally, the station can originate a local call to another station served by call router 130.

If station 138 remains off-hook after being connected to port SP1 of MSU 120, SU OFHK Detector 407 generates a true condition on path 414 to logic circuit 405. Combinatorial logic circuit 405, in turn, operates K5 relay 516 to remove local battery and SU OFHK DET 407 from the SP bus 533 and thus from station 138; and operates K2 relay 504 to bridge DTMF receiver 403 across the main switch port CO1 via paths 501 and 424. At the same time, operation of K5 relay 516 serves to connect the Sp bus 533 to C.0. port 431 and thus to main switch 100 via line 111, path 104 through transfer switch 103, and line 101. The main switch provides talking battery and dial tone to station 138. At this point, the subscriber at station 138 may manipulate the station keypad to provide a called number to main switch 100; or may select the "#" pad to indicate origination of a local station to station call.

If the subscriber at station 138 enters a full complement of numbers for a call through main switch 100, the call will proceed as a normal telephone call. If the called party answers the call, a "stable talking connection" is established through main switch 100, router 130 and MSU 120.

Stable talking connections through MSU 120 are continuously monitored by LOOP I DET 401 in MSU 120 to detect hang-up but not switch hook flashes. Upon detection of hang-up, by LOOP I DET 401, combinatorial logic 405 releases K5 relay 516 and K2 relay 503 to reconnect SU OFHK DET 407 to monitor for hang-up by the local station e.g., station 138; and to reconnect DTMF receiver 403 to the SP bus 533 to prepare for handling another request for service. When the local station e.g., station 138 goes on-hook, the output of SU OFHK DET 407 will be inactive. When both LOOP I DET 401 and SU OFHK DET 407 provide inactive output signals, combinatorial logic 405 resets the MSU to the idle state and issues an IDLE signal (IDL) on path 125.

When the output signals of station current detectors 202-222 in call router 130 indicate that the connected stations 138-140 are all on-hook, logic circuit 209 resets the call router to the initial power on condition. If both call router 130 and MSU 120 are in the idle state, logic circuit 209 transmits a RST signal on path 107 to reset transfer switch 103 to the "preferred" state.

Since Loop I DET 401 does not respond to switch hook flashes, a local station may fully utilize switch hook activated main switch services e.g., answer call waiting, dial transfer, station add on, etc.

Stable talking connections through MSU 120 are also continuously monitored by DTMF receiver 403 to detect requests for further service from the local party. For example, a subscriber at a local station involved in a stable talking connection may, by way of key pad signals, add another local station to the connection or place the main switch line on hold and complete a consultation call to another local station.

A subscriber at one of the local stations e.g., station 138 may complete a call to another local station by first entering a keypad "#" signal and the entering the number of the called local station. This signal, after being detected by DTMF RCVR 403 and reported to combinatorial logic 405, causes MSU 120 to be configured into a form for intercom among stations. Namely, K3 relay 505 and K5 relay 516 are released and K8 relay 514 is activated to cause line 111 appear to be On-hook (open circuit) to the main switch 100. At the same time, because K5 relay 516 is released, local battery is connected to the SP BUS 533 providing talk battery power to the stations. If the offhook station dials another station's number, logic 405 applies ringing current to that station in the same way as the incoming call actions described above. When the called station answers, an internal conversation path is established. Additional parties can be added in the same way to form a conference call. Since line 111 is unterminated during a local intercom call, main switch 100 may attempt to complete an incoming call on that line since it appears to be idle. If RING DET 404 detects ringing at port CO1 when MSU 120 is serving an intercom call, logic 405 activate Ringing generator 411 to place ringing current on path 425 and thus to the network comprising C2 capacitor 509, R2 resistor 508, and C1 capacitor 507 to ground. RFB resistor 561 is a relatively large resistor which serves to couple a ringing current signal to the back contact of K5 relay 516. Since K5 relay 516 is in the released state during an intercom call, the signal provided trough RFB resistor 561 is heard by the parties to the intercom call as an indication of a call waiting. Since K3 relay 505 is not operated during station to station calls, the signal across R2 resistor 508 is isolated from path 501 and thus from port CO0.

Due to the unique arrangement in call router 130, when MSU 120 is attempting to extend a call to reach a busy station, the call is automatically "forwarded" to its associated TAD. In FIG. 1, details of this feature are illustrated for station 140 with the special path 136 connecting from SPM-RPM junction path 122 to TADM 137. When a call is placed to reach station 140 which is already engaged in a conversation, MSU 120 applies ringing current to path 122 as normal without regarding whether STNM is busy. Since STNM is already engaged in a conversation, the associated relay 212 is in the activated position in which RPM 122 is unterminated in an open circuit of the back contacts of relay 212. The ringing current applied by the MSU does not reach station 140. Instead, following the path 136, the ringing current can arrive at TADM 137. After its preset number of rings, TADM 137 answers the call. Because of its unique position, the TADM can respond to calls to station 140 either when it does not answer or when it is busy. Accordingly, TADM 137 provides the functionality and appearance of a large voice mail system. For example, the OGM may state that the called party is "either on another phone call or out of the office" without prior knowledge of the exact current condition.

After a request has been referred to MSU 120, the call router station ports STN1-STNM, other than the one which is connected to the MSU for service of a request, remain connected to the P2 BUS 203 and to local battery 206. Group Loop I Detector 205 monitors the P2 bus to detect further requests for service. If upon detection of another request for service, combinatorial logic 209 finds that MSU 120 is not "available" to serve the latest request, call router 130 proceeds to serve the call origination request without the assistance of MSU 120.

Since call router 120 is not equipped to serve requests for local station to station calls without assistance of MSU 120, only station requests for calls through main switch 100 can be served.

In providing service to the second request for origination of a call from one of the stations 139, 140, combinatorial logic 209 disconnects all stations, other than the station requesting outgoing service, from P2 bus 203 by releasing the associated ones of the line relays 210, 212; and transfers P2 bus 203 from local battery 206 to the CO1 port. Upon completion of these actions, the station requesting service e.g., station 140 is connected to the main switch 100 by a path which includes port CO1, line 112, a path through transfer switch 103 e.g., path 105 and line 101. The closed loop from station 140 is passed to the main office which returns dial tone to station 140. Station 140 may proceed to outpulse the number of the station called and the call proceeds as a normal main switch telephone call.

If upon detection of another request for service, combinatorial logic 209 finds that MSU 120 is either idle or "available" to serve the latest request, call router 130 proceeds to refer the request to MSU 120 for service. If MSU 120 is idle, the transfer proceeds as described earlier herein. However, if MSU is maintaining a stable connection, that connection must be transferred to the call router in the same manner as explained below with respect to the transfer of an incoming call detected by call router 130 at port CO1.

An incoming call to call router 130 from main switch 100 is characterized by the presence of ringing current on a line 112 before Line I detector 208 is activated. The occurrence of ringing current on line 112 is detected by ringing detector 207. The output of detector 207 is connected to combinatorial logic 209 by conductor path 266; and the output of the Loop I detector 208 is connected to combinatorial logic circuit 209 over path 267.

All incoming calls which appear at port CO1 are referred to MSU 120 for completion if MSU 120 is either idle or "available" to handle the incoming call. However, if MSU 120 is neither idle or "available", the incoming call will be answered by message center 141. As explained earlier herein, the message center apparatus may be: a telephone answering device which provides an outgoing message to prompt the caller to leave a message; or a music-on-hold device which advises the caller that "the call will be handled in the order received" followed by a recording of music or an advertisement message.

In either case, the message center device does not answer a call until after a selected period of time e.g., 15 to 20 seconds which is sufficient to permit MSU 120 to complete its service of a prior call. When the music-on-hold device answers a call, STNN Loop I detector 280 becomes active and transmits a true signal on conductor 281. This signal alerts combinatorial logic 209 that a call is being held pending availability of MSU 120 to handle the call. If, during the time that the incoming call is "on-hold", MSU 120 becomes "available" to handle a call request and is maintaining a stable connection, that connection is transferred to the call router in the same manner as explained below with respect to the transfer of an incoming call detected by call router 130 at a time at which MSU 120 was "available".

If MSU 120 is "available", as opposed to being "idle", combinatorial logic circuit 209 of call router 130 generates a REQ signal on conductor 135 to toggle the state of transfer switch 103 and to reset MSU 120 to its "power-up" idle state.

MSU 120 is deemed to be "available" to serve an incoming call whenever the MSU is actively maintaining a talking connection (both the ACT signal and the IDL signal are not true).

By way of example, assume that MSU 120 is serving a connection between line 101 and station 140 when call router 130 detects an incoming call on line 102. Since call router 130 cannot handle an incoming call, it frees MSU 120 by switching line 101 to port CO1 of the call router; operates relay 214 to connect port CO1 to the P2 bus 203; and operates relay 212 to establish a replacement talking connection between line 101 and station 140. To accomplish these results, combinatorial logic circuit 209 of call router 130 does the following: issues a REQ signal on conductor 135 to toggle the state of transfer switch 103 to transfer the talking connection on line 101 to path 112 and to transfer the incoming call on line 102 to path 111; and releases all station relays other than relay 212 to connect the idle stations to their respective router ports RP1-RPM. Upon completion of these activities, the talking connection between station 140 and line 101 is maintained by call router 130. The path for maintaining that connection comprises: station port STNM, Station I detector 222, the make contacts of relay 212, the make contacts of relay 214, line loop I detector 208, port CO1, path 112, path 105 in transfer switch 103, and line 101.

FIGS. 4 and 5 are a schematic diagram of a master switching unit (MSU) e.g., 120 of FIG. 1. The subscriber line pair 431 of FIG. 4, corresponds to the pair 111 of FIG. 1. In the case of master switching unit 120 of FIG. 1, path 121 corresponds to path 530 which is connected to station port SP1 in FIG. 5. Although station ports SP1-SPM are four-wire ports in FIG. 5, only the RD and GN conductors (the speech path) are employed herein; and the connected lines e.g., 121, 122 are two-wire paths. The remaining BK and YL conductors of each of the ports SP1-SPM are not employed in the practice of the present invention.

In MSU 120, an incoming call from the main switch 100 is characterized by the presence of ringing current at C.O. port 431 before the Loop I detector 401 is activated; or by the occurrence of "RNG" signals on conductor 128 after service of an incoming call by the message center music-on-hold. The occurrence of ringing current on line 111 is detected by the ringing detector 404. The output of detector 404 is connected to the combinatorial logic 405 by conductor path 451; and the output of the Loop I detector 401 is connected to the combinatorial logic circuit 405 over path 450. Since answer by the music on hold device "trips" the ringing from the main switch, combinatorial logic circuit 209 in call router 130 generates "RNG" signals on conductor path 128 to alert MSU 120 to the new incoming call.

For purposes of illustration only, the logic arrangements of the block 405 comprise sequential logic circuits, memory, and sources of timing signals to generate output signals for control of the elements of the MSU of FIGS. 4 and 5. The functions of these sequential logic circuits may be implemented by stored program controlled arrangements without departing from the spirit and scope of the invention.

Logic circuit 405, in response to an active signal on conductor 451 and a subsequent active signal from Loop I detector 401, energizes coil 504 to operate K2 relay 503. Output signals of relay driver 457 of FIG. 4 are transmitted to the relays of FIG. K5 by the path 458. The distribution of the conductors of the path 458 to the relay coils of FIG. K5 is not shown as such detail would only unnecessarily clutter the drawing. Closure of the make contacts of relay 503 completes a path between the main switch line 431 and DTMF receiver 403. The path from the line 431 to DTMF receiver 403 comprises: Loop I detector 401 in series with one wire of pair 424, wire pair 501, an unnumbered pair of make contacts of relay 503, wire pair 502, wire pair 417, and amplifier 402.

As call signalling information arrives on the main switch line from the calling subscriber, DTMF receiver 403 decodes the signals, digit by digit, and passes the decoded information to combinatorial logic 405. The decoded information which is collected in combinatorial logic 405 is employed to retrieve station translation data stored in combinatorial logic 405. The translation data which is retrieved identifies the physical location i.e., a Station Port (SP) e.g., SP1 which serves the station which is identified by the called number; and identifies the ringing cadence to be used in ringing that station. A plurality of different ringing cadences permit persons in an area with several stations to readily identify which station is being called. Furthermore it is possible to complete calls to different persons to a single station with different ringing signals on the basis of the call signalling information. For example, calls to the station which is reached by a call to the service department provide a first ringing cadence; and calls to the same station which are intended for the sales department provide a second ringing cadence. With this insight, the person answering the call can appropriately tailor the opening greeting.

When the full complement of call signaling information has been collected in logic circuit 405 and the translation completed, logic circuit 405 initiates the application of a ringing current of the correct cadence to the selected station.

Upon completion of the translation, logic circuit 405 provides input control signals to relay driver 457 to operate a switching relay associated with the SP which serves the called station to connect that SP to the Ring Bus 532. In the case of a call to a station which is served by SP1, output signals of relay driver 457 operate K6 relay 518 to connect SP1 to Ring Bus 532 and operate relay K3 to return a confirmation tone to the calling main switch line. At the same time, combinatorial logic circuit 405 enables SP alert timer 406 to initiate measurement of a timeout period of time e.g. 30 seconds; and to generate an ALERT signal (ALT) on path 124 during that period of time. The timeout period of time is the maximum time that ringing current is applied to a station which fails to answer.

Output signals of logic circuit 405 on path 415 control ringing generator 411 to generate ringing signals of the correct cadence. Output signals of ringing generator 411 on conductor 425, by means of the network consisting of capacitor 507, resistor 508, and capacitor 509, provides confirmation tone at the pair of make contacts of the K3 relay 505.

The ringing signal circuit 408 electrically conditions output signals of the ringing generator 411 on conductor 413 to provide ringing current to the called station. The station answer detector 409 is connected in series with one conductor of the output of the ringing circuit 408. Port SP1 530 is connected to the RP1 port of call router 130 via path 121.

In response to an active ALERT (ALT) signal on path 124, logic circuit 209 in call router 130 releases the relays 210-212 associated with the idle ones of stations 138-140 to connect the idle stations to their respective router ports RP1-RPM and thus to the corresponding ports, SP1-SPM, of MSU 120. In FIG. 5, relays K6, K7 are associated with station ports 530, 531 on a one for one basis. Relays K6 and K7 serve to switch the RD and GN conductors of their respective station ports between SP bus 533 and ring bus 532. During the term of an active ALT signal, the called station is connected to ring bus 532 and the idle stations are connected to SP bus 533. Ring bus 532 is monitored for off-hook detection by SU ANS DET 409; and SP bus 533 is monitored for switchhook transitions by SU OFHK DET 407. Although only the called station receives ringing current, the call can be answered from any idle station.

When the called station answers the call, call router combinatorial logic 209 detects that one of the STN I DET outputs 231 through 232 is active, and locks the corresponding one of the relays 210-212 at the released position. Thus, the station answering the call is connected to the MSU 120 for the duration of the conversation. Simultaneously, the SU Answer detector 409 in the MSU recognizes the change and generates an active signal on conductor 460. The combinatorial logic 405, in turn: removes the active signal from conductor 415 to terminate the generation of both the confirmation tone and the ringing signal; operates the K4 relay 512 and K8 relay 514 to connect the main port (MP) and TAD0 142 to the ring bus 532; operates K5 relay 516 to remove local battery from the SP bus; releases K3 relay 505 to connect the C.0. port 431 to SP bus 533; releases the previously operated K6 relay 518 to connect the associated station port SP1 to the SP bus 533; and releases the K2 relay 503 to connect amplifier 402 and the DTMF receiver 403 to the SP bus. Under these operating conditions, the party connected to the C.0. line 431 and the station connected to the selected station port 530 are connected for communication; and DTMF receiver 403 is ready to receive further call signalling information from the local station to permit the local party to initiate a conference/ consultation/ transfer call.

During the duration of a conversation connection, regardless of whether the connection was established while serving a main switch to extension call, an extension to extension call, or an extension to a main switch call, the SP bus 533 is continuously monitored by DTMF receiver 403.

To initiate a conference/consultation call, the party at the local station, by means of the local DTMF pad, generates a "#" signal. The DTMF receiver 403 indicates receipt of a "#" signal to the combinatorial logic 405. The control logic 405, in turn, generates signals to reconfigure the connection in preparation for receipt of further call signalling information. In the case of a connection which involves a main switch line e.g., the line connected to port 431, the control logic 405 generates control signals to: operate K3 relay 505 to put the main switch line on hold with the resistance 508; release the K5 relay 516 to provide local battery to the extension which was part of the connection. If the party at the subject extension generates further call signalling information, that information is recognized by the DTMF receiver 403 and accumulated in the logic circuit 405. If the accumulated information matches a valid number of the system, a port select relay e.g., K7 relay 520 is operated to connect Station Port SP2 to the ring bus 532; and ringing current, as described above with respect to a main switch to station call, is applied to the newly selected station. The ringing connection is monitored by the SU answer detector circuit 409. If the called extension answers, the circuit 409 places an active signal on path 460. The logic circuit 405, in turn, terminates generation of the ringing signal and releases K7 relay 520 to connect the selected Station Port SP2 and the extension connected thereto to the SP bus and thus to the Station Port SP1 and the extension connected thereto. The parties at the two extensions can converse privately since the main switch line is excluded from their connection. Upon completion of consultation, the station again generates a "#" signal. Upon receipt of that signal, the logic circuit 405 generates control signals to: operate the K5 relay 516 to remove local battery from the extension, and releases the K3 relay 505 to bring the party connected to the main switch line into the conversation, thus forming a conference connection.

FIG. 7 illustrates a switching system for serving four main switch lines through the use of a single MSU 720, three transfer switches 701-703 and three call routers 731-733. In FIG. 7, call routers 731-733 each have a relation to MSU 720 that corresponds to the relation between MSU 120 and call router 130 of FIG. 1.

The invention has been described with particular attention to its preferred embodiment; however, it should be understood that variations and modifications within the spirit and scope of the invention may occur to those skilled in the art to which the invention pertains.

What is claimed is:

1. An improved local switching system comprising:
   a line transfer switch (103) comprising: first and second bi-directional line input ports for connection to a main communication switching system (100); first and second output ports; line transfer switching means (104, 105) for selectively connecting said first and second input ports respectively to said first and second output ports and for alternatively selectively connecting said first and second input ports respectively to said second and first output ports; and first control means (304) for controlling said switching means; said first control means comprising reset and request control signal input terminals;
   a master switching unit (120) comprising: a first line transfer port (CO0), a plurality of router ports (SP1-SPM); means (111) for coupling said first line transfer port to said first output port; and means within said master switching unit for: selectively completing originating and terminating calls between said first line transfer port and said router ports and among said router ports; means for maintaining stable talking connections; and means for generating master switching unit status signals; comprising: idle, busy, and available status signals;
   call routing means (130) comprising: a plurality of master switching unit ports (RP1-RPM) corresponding in number to said router ports (SP1-SPM) and individually connected to said router ports (SP1-SPM); a second line transfer port (CO1); a plurality of station ports (STN1-STNM); and internal switching means (210, 212) for selectively connecting said station ports individually to said master switching unit ports (RP1-RPM); and alternatively selectively individually connecting said station ports to said second transfer port (CO1); second control means (209) for controlling said line transfer switch, said internal switching means, and said call routing means; and means (124-126) for coupling said master switching unit status signals to said second control means.

2. An improved local switching system in accordance with claim 1 wherein:

said call routing means comprises means for detecting incoming requests for service from said main communication switching system 100 which appear at said second line transfer port; and wherein said second control means (209), in response to an incoming request for service signal and said availability status signals other than said busy status signal, generates signals for controlling said line transfer switch (103), said internal switching means (210, 212) and said master switching unit (120) to transfer said incoming call requests to said master switching unit (120) for service.

3. An improved local switching system in accordance with claim 2 wherein:

said second control means, in response to an incoming request for service signal and said available status signal, generates further signals for controlling said internal switching means to transfer a talking connection from said master switching unit to said call routing means.

4. An improved local switching system in accordance with claim 2 wherein:

said call routing means further comprises a message center port; and said second control means, in response to an incoming request for service signal and said busy status signal, connects incoming call requests to said message center port.

5. An improved local switching system in accordance with claim 4 wherein said system further comprises:

music-on-hold means, connected to said message center port, for answering incoming calls to said message center port;

means for detecting answer of a call by said music-on-hold means and for generating call-on-hold signals; and said second control means, in response to a call-on-hold signal and said availability status signals other than said busy status signal, generates signals for controlling said line transfer switch, said internal switching means and said master switching means to transfer said incoming call requests to said master switching unit for service.

6. An improved local switching system in accordance with claim 1 wherein:

said call routing means comprises means for detecting call origination requests for service which appear at said station ports; and wherein said second control means, in response to a call origination request for service signal and said availability status signals other than said busy status signal, generates signals for controlling said line transfer switch, said internal switching means and said master switching means to transfer said call origination requests to said master switching unit for service.

7. An improved local switching system in accordance with claim 6 wherein:

said second control means, in response to a call origination request for service signal and said available status signal, generates further signals for controlling said internal switching means to transfer a talking connection from said master switching unit to said call routing means.

8. An improved local switching system in accordance with claim 6 wherein:

said second control means, in response to a call origination request for service signal and said busy status signal, connects call origination requests to said second line transfer port.

* * * * *